US006883810B2

(12) United States Patent
Svartz et al.

(10) Patent No.: US 6,883,810 B2
(45) Date of Patent: Apr. 26, 2005

(54) AIR SPRING STIFFNESS CONTROLLER

(75) Inventors: Bjorn O. Svartz, Jamestown, NC (US); Darris White, Superior, CO (US)

(73) Assignee: Volvo Trucks North America, Inc., Greensboro, NC (US)

( * ) Notice: Subject to any disclaimer, the term of this patent is extended or adjusted under 35 U.S.C. 154(b) by 0 days.

(21) Appl. No.: 10/287,268

(22) Filed: Nov. 4, 2002

(65) Prior Publication Data

US 2004/0084858 A1 May 6, 2004

(51) Int. Cl.[7] .............................................. B60G 17/052

(52) U.S. Cl. ........................... 280/5.519; 280/124.161; 267/64.28

(58) Field of Search .......................... 280/5.515, 5.518, 280/5.519, 124.157, 124.16, 124.161; 267/64.22, 64.25, 64.28, 64.27, 64.11

(56) References Cited

U.S. PATENT DOCUMENTS

| | | | | | |
|---|---|---|---|---|---|
| 3,955,590 | A | | 5/1976 | Palm et al. | |
| 4,030,738 | A | | 6/1977 | Willetts | |
| 4,564,214 | A | | 1/1986 | Tokunaga et al. | |
| 4,580,806 | A | | 4/1986 | Kolstad et al. | |
| 4,690,429 | A | | 9/1987 | Asami et al. | |
| 4,697,796 | A | * | 10/1987 | Kitamura et al. | 267/64.24 |
| 4,732,077 | A | | 3/1988 | Schweikert | |
| 4,744,589 | A | | 5/1988 | Buma et al. | |
| 5,060,959 | A | | 10/1991 | Davis et al. | |
| 5,071,159 | A | | 12/1991 | Kamimura et al. | |
| 5,226,675 | A | | 7/1993 | Noah et al. | |
| 5,255,935 | A | * | 10/1993 | Imani | 280/124.157 |
| 5,428,533 | A | * | 6/1995 | Ogawa | 280/5.515 |
| 5,452,919 | A | | 9/1995 | Hoyle et al. | |
| 5,727,588 | A | | 3/1998 | Lin | |
| 6,015,155 | A | | 1/2000 | Brookes et al. | |
| 6,276,710 | B1 | | 8/2001 | Sutton | |
| 6,644,632 | B1 | * | 11/2003 | Jaberg | 267/64.28 |
| 2003/0067103 | A1 | * | 4/2003 | Easter | 267/64.28 |

FOREIGN PATENT DOCUMENTS

| | | | | | |
|---|---|---|---|---|---|
| EP | 166702 | A2 | * | 1/1986 | B60G/11/26 |
| EP | 0 686 518 | | | 12/1995 | |
| JP | 59106308 | A | * | 6/1984 | B60G/21/06 |
| WO | WO 97/09190 | | | 3/1997 | |

* cited by examiner

*Primary Examiner*—Peter C. English
(74) *Attorney, Agent, or Firm*—Watts Hoffmann Co., LPA

(57) ABSTRACT

A method and apparatus for adaptively damping relative motion between the wheels and the frame of a heavy duty truck having a frame suspended on wheels by a suspension system. An air spring is disposed between the frame and at least one of the wheels having a primary reservoir for holding air and a piston adapted to act upon the air in the reservoir to compress the air and thereby provide support for the frame. An auxiliary reservoir holds air and can be placed in fluid communication with the primary reservoir to increase an effective volume of air upon which the piston acts. A control valve selectively places the auxiliary reservoir in communication with the primary reservoir based on vehicle operating parameters. The control valve can be actuated mechanically by forces acting on the wheels or by a controller that controls the valve based on wheel torque and road roughness.

7 Claims, 3 Drawing Sheets

START (SOFT SETTING) 52
54 VEHICLE SPEED
56 ENGINE TORQUE
58 ENGINE RPM
60 CALCULATE TORQUE AT WHEELS, Tw
AIR SPRING PRESSURE 62
CALCULATE ROAD ROUGHNESS, Pstd 64
CALCULATE AGGREGATE CONSTANT k=Tw−a Pstd 66
68 k>k limit ? NO RETURN TO START 69
YES
SET SPRING STIFF SETTING 70
DELAY 30 SEC. 72
CALCULATE AGGREGATE ADJUSTMENT CONSTANT k=Tw−a ·Pstd 74
k>k limit ? YES 76
NO
RETURN TO START 78

START
(SOFT SETTING)
52
54
VEHICLE SPEED
56
ENGINE TORQUE
58
ENGINE RPM
60
CALCULATE TORQUE AT WHEELS, Tw
AIR SPRING PRESSURE
62
CALCULATE ROAD ROUGHNESS, Pstd
64
CALCULATE AGGREGATE CONSTANT k=Tw−a Pstd
66
68
k>k limit ?
NO
RETURN TO START
69
YES
SET SPRING STIFF SETTING
70
DELAY 30 SEC.
72

YES
76
k>k limit ?
NO
CALCULATE AGGREGATE ADJUSTMENT CONSTANT k=Tw−a ·Pstd
74
RETURN TO START
78

AIR SPRING STIFFNESS CONTROLLER

TECHNICAL FIELD

The invention relates generally to suspension systems for over the highway, heavy duty trucks and more particularly to a locking suspension system that varies the stiffness of suspension components in response to operating conditions.

BACKGROUND OF THE INVENTION

The frames of heavy duty trucks are typically suspended on torque reactive rear suspensions. Commonly, these suspensions provide a leaf or air spring to maintain a constant vehicle height. As drive train systems are optimized to provide greater torque output, suspensions in general have been made stiffer to compensate for torque reaction and driveline vibrations that are associated with the higher torques. While such compensation has diminished the effects of torque reaction and driveline vibrations to provide a relatively comfortable ride during normal operating conditions, the stiffer suspensions cannot absorb high impact forces such as those caused by rough roads and as a result do not provide adequate cushioning against such events.

Several techniques have been used in the art to adaptively control the stiffness characteristics of vehicle suspension components, such as shock absorbers or air springs, in response to operating characteristics. For example, U.S. Pat. No. 4,564,214 to Tokunaga et al. discloses a shock absorber having an air chamber that serves as an integral air spring. The air chamber is in fluid communication with an auxiliary reservoir to provide a relatively "soft" ride during normal operating conditions. When the steering wheel is turned, the air chamber is disconnected from the auxiliary reservoir, which results in a smaller reservoir and stiffer ride characteristics, to provide a relatively "hard" ride during the steering event to enhance vehicle control. U.S. Pat. No. 6,276,710 to Sutton discloses a system of air springs for a vehicle tandem axle in which air springs on the same side of the vehicle are selectively placed in fluid communication with one another to provide a relatively "soft" ride by virtue of effectively increasing the volume of air in the reservoir over the volume of air in the reservoir of each air spring by itself. When the vehicle body begins to roll, the air springs are disconnected to provide better control until the body returns to its normal orientation.

SUMMARY OF THE INVENTION

A heavy duty truck suspension system having air springs whose stiffness characteristics can be adjusted according to operating parameters can provide an improved ride According to an embodiment of the invention, an apparatus is provided for adaptively controlling relative motion between the wheels and the frame of a heavy duty truck having a frame suspended on wheels by a suspension system. An air spring is disposed between the frame and at least one of the wheels having a primary reservoir for holding air and a piston adapted to act upon the air in the reservoir to compress the air and thereby provide support for the frame. An auxiliary reservoir for holding air that can be placed in fluid communication with the primary reservoir to increase an effective volume of air upon which the piston acts is mounted in proximity to the primary reservoir. A control valve selectively places the auxiliary reservoir in communication with the primary reservoir based on vehicle operating parameters.

In a preferred embodiment, the auxiliary reservoir is adjacent the primary reservoir and the control valve is disposed within a channel connecting the primary reservoir to the auxiliary reservoir. The control valve includes a housing having ports disposed therein that connect the primary reservoir to the auxiliary reservoir and a plunger for controlling the flow of air between the primary and auxiliary reservoirs. The plunger is mounted within the housing and is moveable between a first position in which the primary and auxiliary reservoirs are not in fluid communication and a second position in which the primary and auxiliary reservoirs are in fluid communication.

According to a feature of one embodiment of the invention, the plunger is in the first position under normal operating conditions and the plunger moves to the second position when acted upon by relatively large impulse forces from the wheels of the vehicle. In an exemplary embodiment, a controller is provided that monitors vehicle operating conditions and that controls the control valve based on vehicle operating conditions. The controller causes the control valve to place the auxiliary reservoir in fluid communication with the primary reservoir when relatively large impulse forces are experienced by the wheels.

In an embodiment, the controller determines a torque at the vehicle wheels and a road roughness indicator and causes the control valve to selectively connect or disconnect the primary reservoir to the auxiliary reservoir in response to the torque and road roughness. The controller may monitor vehicle speed, engine torque, engine speed, and air spring pressure to determine the amount of torque at the vehicle wheels and the road roughness indicator.

These and other objects, advantages, and features of the invention will be better understood from the accompanying detailed description of preferred embodiments of the invention when reviewed in conjunction with the accompanying drawings.

BRIEF DESCRIPTION OF THE DRAWINGS

The present invention is illustrated by way of example and not limitation in the figures of the accompanying drawings, in which.

DETAILED DESCRIPTION OF THE PREFERRED EMBODIMENT

Figure 1:
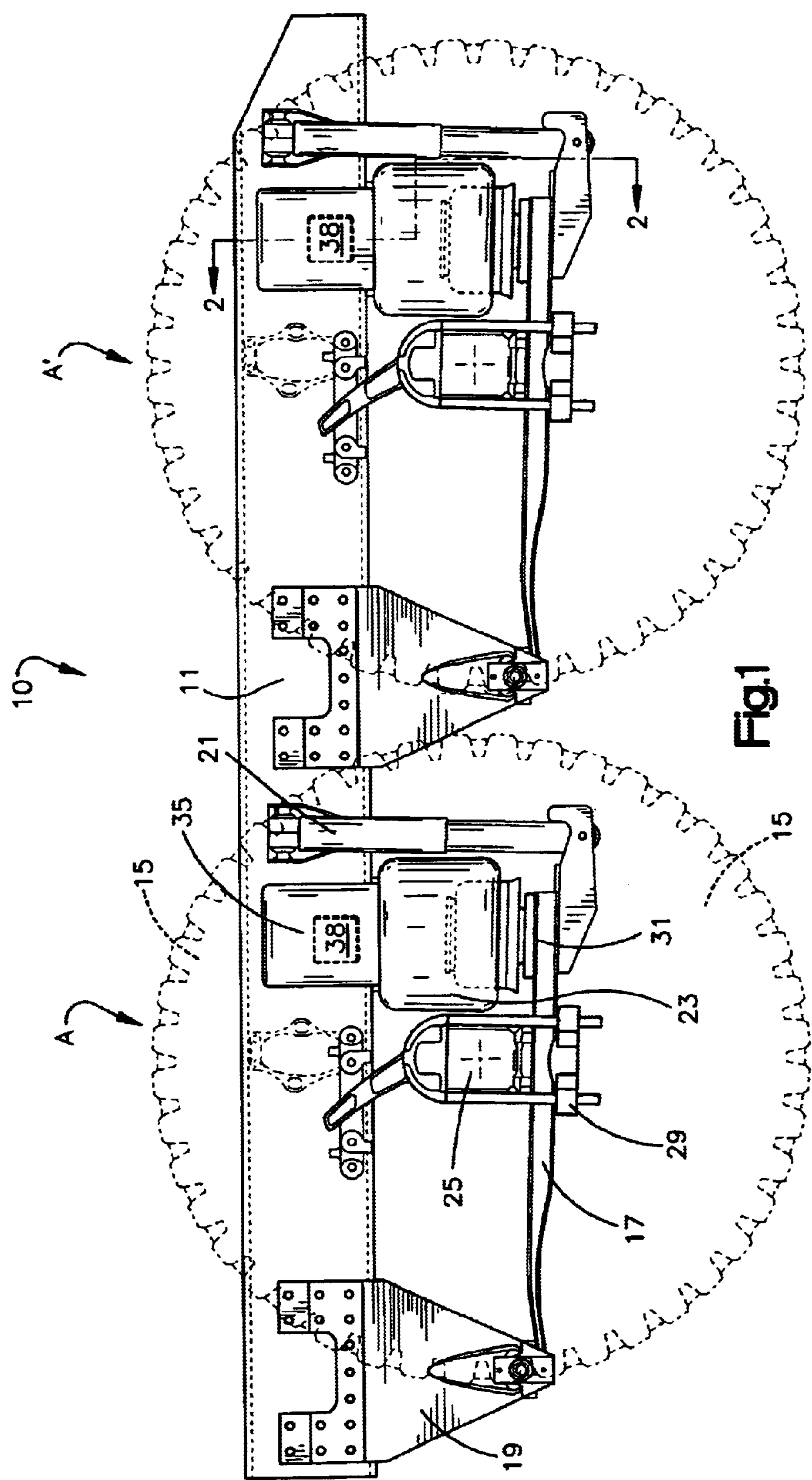
FIG. 1 is a side plan view of a heavy duty truck suspension system constructed in accordance with an embodiment of the present invention.

FIG. 1 depicts a side plan view of a trailing arm torque reactive suspension system 10 associated with a pair of rear wheel sets A and A' that drive a frame member 11 of a heavy duty truck. The suspension components associated with each wheel set are the same. The basic components of the suspension system 10 should be familiar to one of skill in the art and will only be outlined generally below.

The suspension system 10 includes a main support member 17 that is pivotally connected to the frame 11 by a spring hanger bracket 19. A drive axle 25 is attached to the main support member using a U bolt 29. A shock absorber 21 is connected between the main support member 17 and the frame member 11 to damp the rise and fall of the frame of the vehicle with respect to the road. An air spring 23 (shown in more detail in FIG. 2) is bolted at its base to a base bracket 31 which is in turn connected to the main support member 17. The top of the air spring 23 is attached to the adjacent side of the frame member 11 by means of a bracket (not shown). The air spring provides cushioning for the load borne by the vehicle frame as well as providing support to maintain the load at a desired height with respect to the wheels 15. The air spring also affects the stiffness characteristics of the suspension by controlling the level of impulse load that is transferred to the shock absorber 21.

Figure 2:
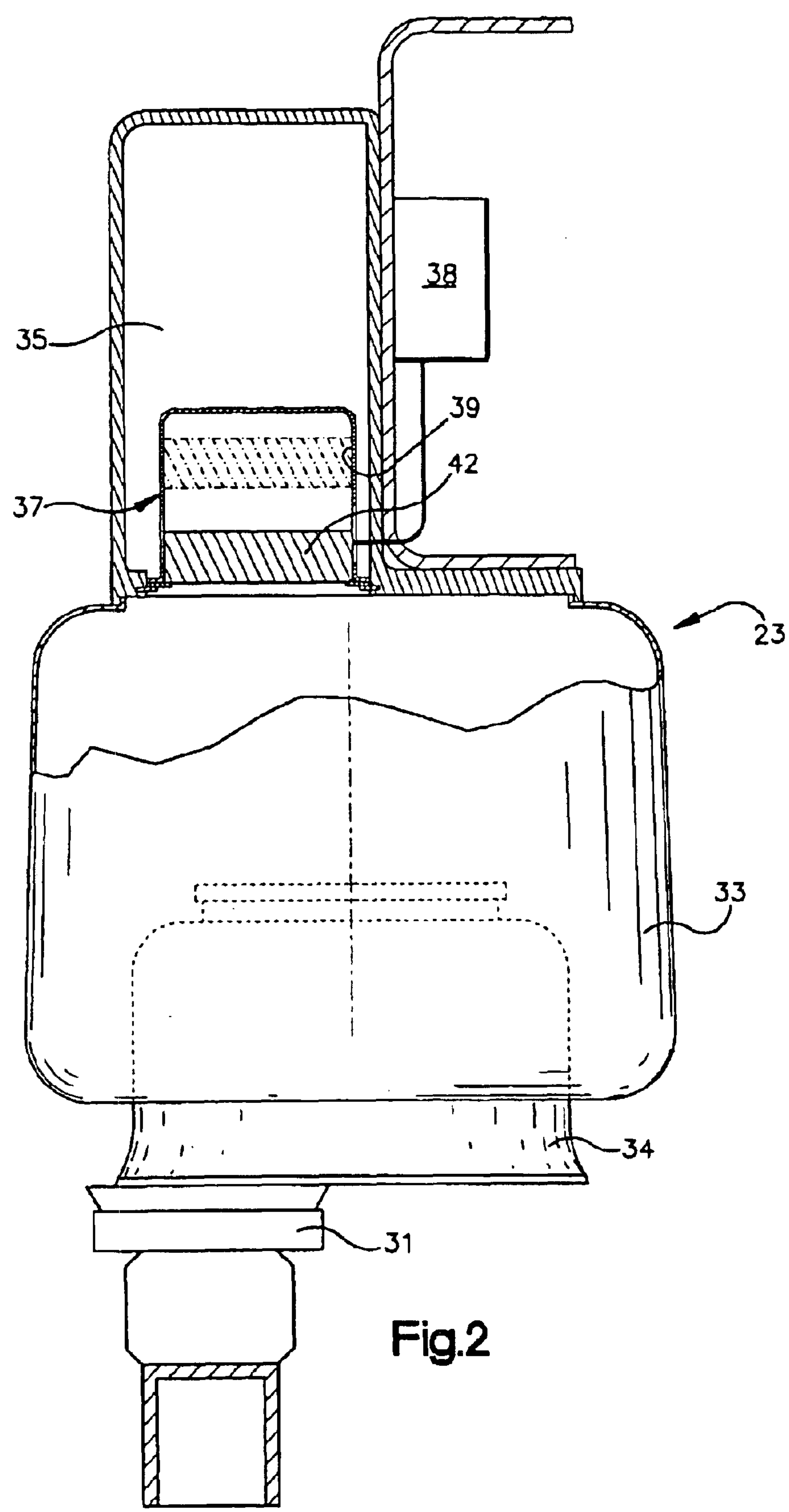
FIG. 2 is a cross sectional view of an air spring taken along line 2—2 of FIG. 1.

FIG. 2 depicts a side view of the air spring 23. An air spring primary reservoir 33 is mounted to base bracket 31. An air spring piston 34 protrudes into the primary reservoir 33 and is connected to the reservoir by a seal ring or rolling rubber sheath. The piston 34 acts to compress the air in the primary reservoir. The pressure created within the reservoir by the protrusion of the piston into the reservoir creates an upward force on the vehicle frame 11 to support the frame. When forces are input into the system from the load on the vehicle frame or from the wheels, the air spring 23 cushions the ride. The stiffness of the air spring is inversely proportional to the volume of the reservoir upon which the piston 34 acts. The relationship between spring stiffness K and the volume V of air in the reservoir is expressed in the equation $K=\alpha pA^2/V$, where $\alpha$ is a constant, p is the pressure within the reservoir, and A is the effective area of the air spring. The effective area of the air spring is approximately equal to the circular area determined by the meniscus of the rubber sheath surrounding the primary reservoir. As can be seen from the preceding equation, the stiffness of the air spring 23 can be reduced by increasing the volume of the reservoir. In FIG. 2, the auxiliary reservoir 35 is isolated from the primary reservoir 33 to provide a lower effective volume and hence a stiffer spring.

The air spring 23 features an auxiliary reservoir 35 that can be selectively placed in fluid communication with the primary reservoir 33 via control valve 37. The control valve 37 includes an actuatable plunger 42 housed within a valve housing 39. The valve housing 39 has a plurality of ports disposed about a periphery for connecting the primary reservoir 33 with the auxiliary reservoir 35. When softer air spring characteristics are desired, the plunger 42 is moved away from the primary reservoir 33 to a position (shown in phantom) that opens channels of flow through the ports between the primary and auxiliary reservoirs. In this manner, the volume of the reservoir upon which the piston 34 acts is increased by the volume of the auxiliary reservoir 35 to reduce the stiffness of the air spring.

In one embodiment, the control valve is operated in a passive manner. Under normal operation conditions, the spring is set as shown in FIG. 2 to provide relatively high stiffness characteristics. When a high impulse force is introduced to the air spring 23 from the wheels the air in the reservoir 33 is compressed to create a pressure that moves the plunger 42 away from the primary reservoir. When the plunger 42 is moved up to the position at which the auxiliary reservoir 35 is placed in communication with the primary reservoir 33, the air spring stiffness is reduced to provide additional cushioning against the high impulse force. Once the force is removed, the plunger 42 returns to its normal position under the force of gravity or an assist mechanism such as a spring (not shown) and the system returns to its original stiffness characteristics.

Figure 3:
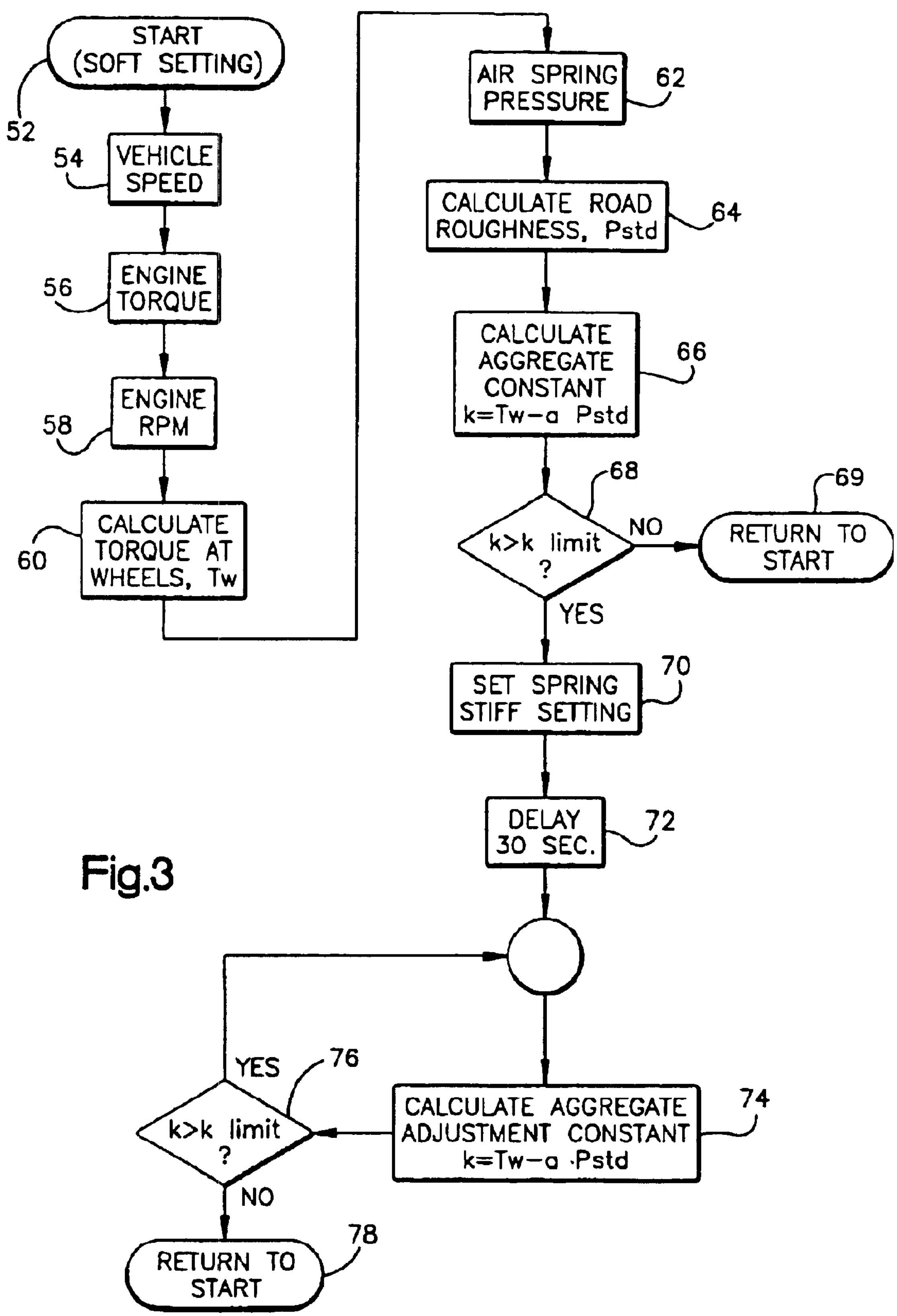
FIG. 3 is a flow chart outlining method steps that are used to control the stiffness characteristics of the air spring of FIG. 2.

In an exemplary embodiment, the control valve 37 is controlled by a microprocessor 38 that monitors various operating conditions and actuates the plunger 42 to provide a softer air spring when desirable. FIG. 3 is a flowchart that outlines steps that can be used to control the plunger. The air spring begins in the softer mode at step 52, with the auxiliary reservoir in communication with the primary reservoir. The microprocessor monitors vehicle speed, engine torque, and engine speed in steps 54, 56, 58 and calculates a torque at the vehicle's wheels (Tw) in step 60. The air spring pressure is input to the microprocessor instep 62 to be used to calculate the road roughness (Pstd) in step 64. In step 66, an aggregate constant k is determined by subtracting the wheel torque (Tw) from a scaled version of the road roughness (aPstd). If the aggregate constant is higher than a threshold, meaning that the road is relatively smooth or the suspension torque reaction is relatively low, the spring is set to the stiffer setting in steps 68 and 70. If k is lower than the threshold, the spring remains in the softer mode as shown in step 69. Once the spring is set to the stiff setting, the algorithm delays for 30 seconds and then recalculates the aggregate constant (step 72). If the new value of the aggregate constant is still higher than the threshold, the spring remains stiff as shown in steps 74 and 76. If the constant is lower than the threshold, the spring is set back to the softer setting in step 78.

As can be seen from the foregoing description, a heavy duty truck suspension system having air springs whose stiffness characteristics can be adjusted according to operating parameters can provide an improved ride. Although the present invention has been described with a degree of particularity, it is the intent that the invention include all modifications and alterations from the disclosed design falling within the spirit or scope of the appended claims.

We claim:

1. For a vehicle having a frame suspended on wheels by a suspension system including an adaptive air spring comprising a primary reservoir and an auxiliary reservoir, a method of controlling a valve that selectively places the primary and auxiliary reservoirs in fluid communication to vary an air spring stiffness between a stiff mode resulting from the primary and auxiliary reservoirs not being placed in communication and a soft mode in which the primary and auxiliary reservoirs are in communication, comprising;

monitoring vehicle operating parameters including at least one of engine speed, engine torque, and air spring pressure to determine a road roughness; and causing the valve to place the primary and auxiliary reservoirs in communication when the road roughness indicates a rough road.

2. The method of claim 1 comprising the step of calculating a wheel torque that is present at the wheels of the vehicle based on the monitored parameters.

3. The method of claim 2 comprising the step of calculating an aggregate constant by calculating a difference between the wheel torque and a scaled version of the road roughness.

4. The method of claim 3 comprising the step of causing the valve to place the primary and auxiliary reservoirs in communication when the aggregate constant is below a predetermined threshold.

5. The method of claim 3 comprising the step of causing the valve to take the primary and auxiliary reservoirs out of communication when the aggregate constant exceeds a predetermined threshold.

6. The method of claim 5 comprising the step of causing the valve to maintain the primary and auxiliary reservoirs out of communication for a predetermined delay period and then recalculating the aggregate constant.

7. For a vehicle having a frame suspended on wheels by a suspension system, an apparatus for adaptively controlling relative motion between the wheels and the frame, the apparatus comprising:

an air spring disposed between the frame and at least one of the wheels, wherein the air spring comprises a primary reservoir for holding air and a piston adapted to act upon the air in the reservoir to compress the air and thereby provide support for the frame;

an auxiliary reservoir that holds air wherein the auxiliary reservoir can be placed in fluid communication with the primary reservoir to increase an effective volume of air upon which the piston acts; and a valve that selectively places the auxiliary reservoir in communication with the primary reservoir in response to variations in pressure in the primary reservoir, wherein the valve comprises a moveable plunger that moves away from the primary reservoir when the primary reservoir pressure exceeds a threshold pressure to place the primary reservoir in communication with the auxiliary reservoir, and wherein when the pressure in the primary reservoir is reduced, the plunger returns to an original position relative to the primary reservoir under force of gravity.

* * * * *